US008887693B2

(12) United States Patent
Chi et al.

(10) Patent No.: US 8,887,693 B2
(45) Date of Patent: *Nov. 18, 2014

(54) SYSTEM AND METHOD FOR ESTIMATING TURBOCHARGER COMPRESSOR INLET AIR FLOW RATE

(75) Inventors: John N. Chi, Dubuque, IA (US); John M. Mulloy, Columbus, IN (US); Sriram S. Popuri, Greenwood, IN (US)

(73) Assignee: Cummins, Inc., Columbus, IN (US)

( * ) Notice: Subject to any disclaimer, the term of this patent is extended or adjusted under 35 U.S.C. 154(b) by 522 days.

This patent is subject to a terminal disclaimer.

(21) Appl. No.: 13/244,547

(22) Filed: Sep. 25, 2011

(65) Prior Publication Data

US 2013/0080025 A1 Mar. 28, 2013

(51) Int. Cl.
F02D 41/18 (2006.01)
G01M 15/00 (2006.01)
F02D 28/00 (2006.01)
F02D 23/00 (2006.01)
F02D 41/00 (2006.01)

(52) U.S. Cl.
CPC ............... F02D 28/00 (2013.01); G01M 15/00 (2013.01); F02D 2200/0414 (2013.01); F02D 2200/0402 (2013.01); F02D 23/00 (2013.01); F02D 2200/0406 (2013.01); Y02T 10/144 (2013.01); F02D 41/0007 (2013.01)

USPC .............................. 123/434; 123/435; 701/103

(58) Field of Classification Search
CPC ................... F01D 41/0002; F01D 2200/0406; F01D 41/18; F01D 35/023
USPC ........... 123/434, 435, 436, 673, 674; 701/103
See application file for complete search history.

(56) References Cited

U.S. PATENT DOCUMENTS

| 6,804,601 | B2 * | 10/2004 | Wang et al. | 701/107 |
|---|---|---|---|---|
| 2003/0182048 | A1 * | 9/2003 | Wang et al. | 701/107 |
| 2006/0005540 | A1 * | 1/2006 | Baize et al. | 60/600 |
| 2007/0151240 | A1 * | 7/2007 | Mulloy | 60/599 |
| 2009/0250042 | A1 * | 10/2009 | Sujan et al. | 123/568.21 |
| 2012/0137678 | A1 * | 6/2012 | Brahma et al. | 60/605.1 |
| 2013/0080030 | A1 * | 3/2013 | Chi | 701/103 |

* cited by examiner

Primary Examiner — John Kwon
(74) Attorney, Agent, or Firm — Faegre Baker Daniels LLP

(57) ABSTRACT

A system and method are provided for estimating the flow rate of air entering an air inlet of a turbocharger compressor. A first pressure value corresponds to pressure at or near the air inlet of the compressor, and a second pressure value corresponds to pressure at or near the air outlet of the compressor. A temperature value corresponds to a temperature at or near the air inlet of the compressor, and a speed value corresponds to an operating speed of the turbocharger. The flow rate of air entering the air inlet of the turbocharger compressor is illustratively estimated as a function of the first pressure value, the second pressure value, the temperature value and the speed value.

20 Claims, 3 Drawing Sheets

SYSTEM AND METHOD FOR ESTIMATING TURBOCHARGER COMPRESSOR INLET AIR FLOW RATE

FIELD OF THE INVENTION

The present invention relates generally to turbochargers for internal combustion engines, and more specifically to systems and methods for estimating the flow rate of air entering an air inlet of a turbocharger compressor.

BACKGROUND

A turbocharger is conventionally used with an internal combustion engine to increase flow of air entering the engine under certain operating conditions. It is desirable to estimate the flow rate of air entering an air inlet of a compressor of a turbocharger using information provided by actual and/or virtual on-board sensors other than a turbocharger compressor air inlet flow rate sensor.

SUMMARY

The present invention may comprise one or more of the features recited in the claims appended hereto, and/or one or more of the following features and combinations thereof. A system for estimating a flow rate of air entering an air inlet of a compressor of a turbocharger may comprise a first pressure sensor configured to produce a first pressure signal indicative of pressure at or near the air inlet of the compressor, a second pressure sensor configured to produce a second pressure signal indicative of pressure at or near the air outlet of the compressor, a temperature sensor configured to produce a temperature signal indicative of temperature at or near the air inlet of the compressor, a speed sensor configured to produce a speed signal indicative of an operating speed of the turbocharger, and a control circuit including a memory having instructions stored therein that are executable by the control circuit to estimate the flow rate of air entering the air inlet of the compressor as a function of the first and second pressure signals, the temperature signal and the speed signal.

The memory may have stored therein a map of compressor pressure ratio values as a function of compressor inlet air flow rate values at a plurality of different turbocharger operating speeds, and the instructions stored in the memory may include instructions that are executable by the control circuit to process the speed signal using the map to generate a compressor inlet air flow rate variable as a function of compressor pressure ratio values at a turbocharger operating speed that corresponds to the speed signal. The instructions stored in the memory may further include instructions that are executable by the control circuit to determine a compressor-corrected turbocharger operating speed value as a function of the speed signal and the temperature signal. The map may be stored in the memory as a map of compressor pressure ratio values as a function of compressor-corrected inlet air flow rate values at a plurality of different compressor-corrected turbocharger operating speeds. The instructions stored in the memory may further include instructions that are executable by the control circuit to determine a current compressor pressure ratio value as a function of the first and second pressure values, and to process the current compressor pressure ratio value using the compressor-corrected turbocharger operating speed variable to estimate the compressor-corrected flow rate of air entering the air inlet of the compressor. The instructions stored in the memory may further include instructions that are executable by the control circuit to estimate the flow rate of air entering the air inlet of the compressor as a function of the compressor-corrected flow rate of air entering the air inlet of the compressor, the first pressure signal and the temperature signal.

The instructions stored in the memory may include instructions that are executable by the control circuit to determine a current compressor pressure ratio as a function of the first and second pressure signals, and to process the current compressor pressure ratio, the speed signal and the temperature signal using a compressor pressure ratio map to estimate the flow rate of air entering the air inlet of the compressor. The estimated flow rate of air entering the air inlet of the compressor may represent a compressor-corrected flow rate of air entering the air inlet of the compressor, and the instructions stored in the memory may include instructions that are executable by the control circuit to estimate the flow rate of air entering the air inlet of the compressor as a function of the compressor-corrected flow rate of air entering the air inlet of the compressor, the first pressure signal and the temperature signal.

The control circuit may be configured to control operation of an internal combustion engine operatively coupled to the turbocharger.

A system for estimating a flow rate of air entering an air inlet of a compressor of a turbocharger may comprise a first pressure sensor configured to produce a first pressure signal indicative of pressure at or near the air inlet of the compressor, a second pressure sensor configured to produce a second pressure signal indicative of pressure at or near the air outlet of the compressor, a speed sensor configured to produce a speed signal indicative of operating speed of the turbocharger, and a control circuit including a memory having instructions stored therein that are executable by the control circuit to process the speed signal to determine a speed value corresponding to an operating speed of the turbocharger, to determine a current compressor pressure ratio value as a function of the first and second pressure signals, and to process the speed value and the current compressor pressure ratio value using a compressor pressure ratio map to estimate the flow rate of air entering the air inlet of the compressor.

The system may further comprise a temperature sensor configured to produce a temperature signal indicative of temperature at or near the air inlet of the compressor, and the instructions stored in the memory may include instructions that are executable by the control circuit to determine a compressor-corrected turbocharger operating speed as a function of the speed signal and the temperature signal, and the speed value may be the compressor-corrected turbocharger operating speed. The compressor pressure ratio map may be stored in the memory and may be configured to map compressor inlet air flow rate values to compressor pressure ratio values at a plurality of different compressor-corrected turbocharger operating speeds. The instructions stored in the memory may include instructions that are executable by the control circuit to generate a compressor inlet air flow variable as a function of compressor pressure ratio values by processing the compressor-corrected turbocharger operating speed using the compressor pressure ratio map, and to estimate the flow rate of air entering the air inlet of the compressor by processing compressor inlet air flow variable using the current compressor pressure ratio value. The compressor pressure ratio map may be configured to map compressor-corrected inlet air flow rate values to compressor pressure ratio values at the plurality of different compressor-corrected turbocharger operating speeds, and the compressor inlet air flow variable may be a compressor-corrected inlet air flow variable, and the estimate of the flow rate of air entering the air inlet of the compressor is an estimate of a compressor-corrected inlet air flow rate, and the instructions stored in the memory may further include instructions that are executable by the control circuit to estimate the flow rate of air entering the air inlet of the compressor as a function of the compressor-corrected inlet air flow rate, the first pressure signal and the temperature signal.

The system may further comprise a temperature sensor configured to produce a temperature signal indicative of temperature at or near the air inlet of the compressor, and the instructions stored in the memory may include instructions that are executable by the control circuit to determine the speed value further as a function of the temperature signal, and to estimate the flow rate of air entering the air inlet of the compressor further as a function of the first pressure signal and the temperature signal.

The control circuit may be configured to control operation of an internal combustion engine operatively coupled to the turbocharger.

A method of estimating a flow rate of air entering an air inlet of a compressor of a turbocharger may comprise determining a first pressure value corresponding to pressure at or near the air inlet of the compressor, determining a second pressure value corresponding to pressure at or near the air outlet of the compressor, determining a temperature value corresponding to a temperature at or near the air inlet of the compressor, determining a speed value corresponding to an operating speed of the turbocharger, and estimating the flow rate of air entering the air inlet of the compressor as a function of the first pressure value, the second pressure value, the temperature value and the speed value.

Estimating the flow rate of air entering the air inlet of the compressor may comprise determining a current compressor pressure ratio as a function of the first and second pressure values, and processing the speed value and the current compressor pressure ratio using a compressor pressure ratio map to estimate the flow rate of air entering the air inlet of the compressor, with the compressor pressure ratio map configured to map compressor air inlet flow rate values to compressor pressure ratio values at a plurality of different turbocharger operating speeds. The method may further comprise determining a compressor-corrected turbocharger operating speed as a function of the speed value and the temperature value, wherein the compressor pressure ratio map is configured to map compressor-corrected inlet air flow rate values to compressor pressure ratio values at a plurality of different compressor-corrected turbocharger operating speeds, and processing the speed value and the current compressor pressure ratio using a compressor pressure ratio map to estimate the flow rate of air entering the air inlet of the compressor may comprise processing the compressor-corrected turbocharger operating speed and the current compressor pressure ratio using the compressor pressure ratio map to estimate a compressor-corrected inlet air flow rate value, and to estimate the flow rate of air entering the air inlet of the compressor as a function of the compressor-corrected inlet air flow rate value, the first pressure value and the temperature value. Processing the compressor-corrected turbocharger operating speed and the current compressor pressure ratio using the compressor pressure ratio map to estimate a compressor-corrected inlet air flow rate value may comprise using the compressor pressure ratio map to generate a compressor-corrected inlet air flow variable as a function of compressor pressure ratio values at the compressor-corrected turbocharger operating speed, and processing the compressor-corrected inlet air flow variable using the current compressor pressure ratio to estimate the compressor-corrected inlet air flow rate value.

The method may further comprise using a control circuit configured to control operation of an internal combustion engine to which the turbocharger is operatively coupled to execute all of the determining steps and the estimating step.

The method may further comprise determining the first pressure by processing a first pressure signal produced by a first pressure sensor positioned at the air inlet of the compressor, determining the second pressure by processing a second pressure signal produced by a second pressure sensor positioned at the air outlet of the compressor, determining the speed value by processing a speed signal produced by a speed sensor configured to be positioned to sense the operating speed of the turbocharger, and determining the temperature value by processing a temperature signal produced by a temperature sensor positioned at the air inlet of the compressor.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
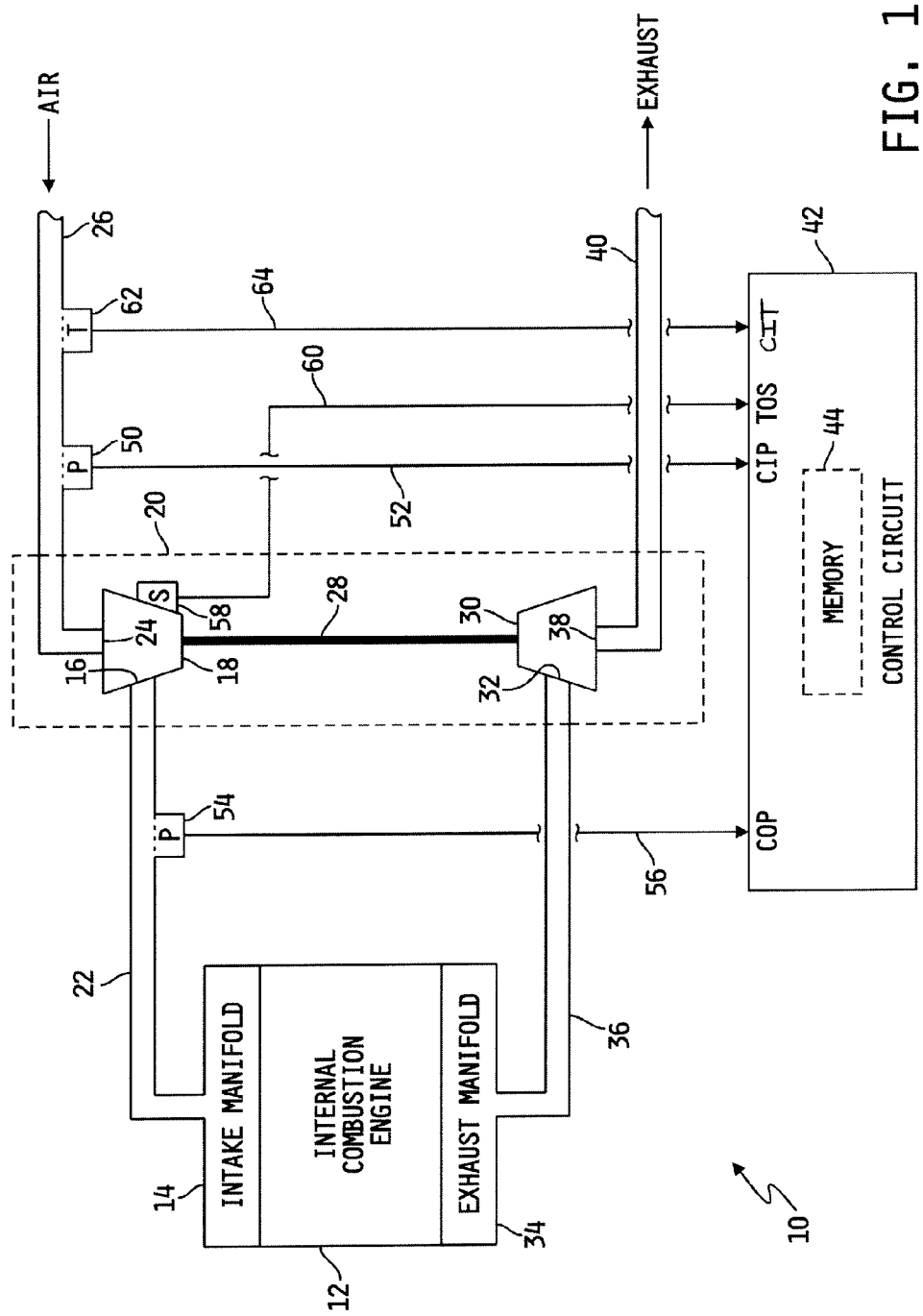
FIG. 1 is a block diagram of one illustrative embodiment of a system for estimating the flow rate of air entering an air inlet of a turbocharger compressor.

Referring now to FIG. 1, a diagrammatic illustration is shown of one illustrative embodiment of a system 10 for estimating the flow rate of air entering an air inlet of a turbocharger compressor. In the illustrated embodiment, the system 10 includes an internal combustion engine 12 having an intake manifold 14 that is fluidly coupled to an air 16 outlet of a compressor 18 of a conventional turbocharger 20 via an air intake conduit 22. The compressor 18 further includes an air inlet 24 coupled to an air intake conduit 26 for receiving fresh air. The turbocharger compressor 18 includes a rotatable wheel (not shown) that is mechanically coupled to one end of a rotatable drive shaft 28 having an opposite end that is mechanically coupled to a rotatable wheel (not shown) of a turbocharger turbine 30. The turbine 30 includes an exhaust inlet 32 that is fluidly coupled to an exhaust manifold 34 of engine 12 via an exhaust conduit 36. The turbine 30 further includes an exhaust outlet 38 that is fluidly coupled to ambient via an exhaust conduit 40.

The turbocharger 20 operates in a conventional manner in which exhaust gas produced by the engine 12 and exiting the exhaust manifold 34 is directed by the exhaust conduit 36 through the turbine 30 causing the turbine wheel to rotate. This rotary motion is translated by the drive shaft 28 to the compressor wheel. The compressor wheel is configured in a conventional manner such that rotation of the compressor wheel by the drive shaft 28 draws more air through the air intake conduit 22 than would otherwise occur in the absence of the turbocharger 20. In the illustrated embodiment, the operating speed of the turbocharger 20 is thus the rotational speed of the combination of the turbine wheel, the drive shaft 28 and the compressor wheel, which is determined primarily by the flow rate of exhaust gas through the turbine 30.

The system 10 further includes a control circuit 42 that is generally operable to control and manage the overall operation of the engine 12. The control circuit 42 includes a memory unit 44 as well as a number of inputs and outputs for interfacing with various sensors and systems coupled to the engine 12. The control circuit 42 is illustratively microprocessor-based, although this disclosure contemplates other embodiments in which the control circuit 42 may alternatively be or include a general purpose or application specific control circuit capable of operation as will be described hereinafter. In any case, the control circuit 42 may be a known control unit sometimes referred to as an electronic or engine control module (ECM), electronic or engine control unit (ECU) or the like. Illustratively, the memory 44 of the control circuit 42 has stored therein one or more sets of instructions that are executable by the control circuit 42, as will be described in greater detail hereinafter, to estimate the flow rate of air entering the air inlet 24 of the turbocharger compressor 18.

The control circuit 42 includes a number of inputs for receiving signals from various sensors or sensing systems associated with system 10. The control circuit 42 is generally operable in a conventional manner to sample the signals produced by the various sensors and/or sensing systems and to processes the sampled signals to determine the associated operating conditions. For example, the system 10 includes a pressure sensor 50 that is disposed in fluid communication with the air intake conduit 26, e.g., at or near the air inlet of the compressor 18, and that is electrically connected to a compressor inlet pressure input, CIP, of the control circuit 42 via a signal path 52. The pressure sensor 50 may be of conventional, and is operable to produce a pressure signal on the signal path 52 that is indicative of air pressure at or near the air inlet 24 of the compressor 18.

The system 10 further includes another pressure sensor 54 that is disposed in fluid communication with air intake conduit 22, e.g., at or near the air outlet of the compressor 18, and that is electrically connected to a compressor outlet pressure input, COP, of the control circuit 42 via a signal path 56. The pressure sensor 54 may be of conventional, and is operable to produce a pressure signal on the signal path 56 that is indicative of air pressure at or near the air outlet 16 of the compressor 18.

The system 10 further includes a speed sensor 58 that is illustratively disposed in communication with the rotatable wheel (not shown) of the compressor 18, and that is electrically connected to a turbocharger operating speed input, TOS, of the control circuit 42 via a signal path 60. The speed sensor 58 may be of known construction, e.g., in the form of a conventional Hall effect or variable reluctance sensor, and is operable to produce a speed signal on the signal path 60 that is indicative of the operating speed of the compressor wheel and thus the operating speed of the turbocharger 20. In other embodiments, the sensor 58 may alternatively be positioned to sense the operating speed, i.e., the rotational speed, of the turbocharger shaft 28 or the rotatable wheel of the turbine 30.

The system 10 further includes a temperature sensor 62 that is disposed in fluid communication with the air intake conduit 26, e.g., at or near the air inlet of the compressor 18, and that is electrically connected to a compressor inlet temperature input, CIT, of the control circuit 42 via a signal path 64. The temperature sensor 62 may be conventional, and is operable to produce a temperature signal on the signal path 60 that is indicative of the temperature at or near the air inlet 24 of the compressor 18.

The system 10 is illustrated in FIG. 1 and described as including physical sensors producing electrical signals that are indicative of operating parameters such as compressor inlet pressure, compressor outlet pressure, turbocharger operating speed and compressor inlet temperature. It will be understood, however, that one or more of these parameters may be alternatively or additionally estimated by the control circuit 42 as a function of electrical signals produced by one or more other physical sensors, i.e., sensors other than those positioned and configured to produce signals that correspond to a direct measure of the subject parameter(s).

Figure 2:
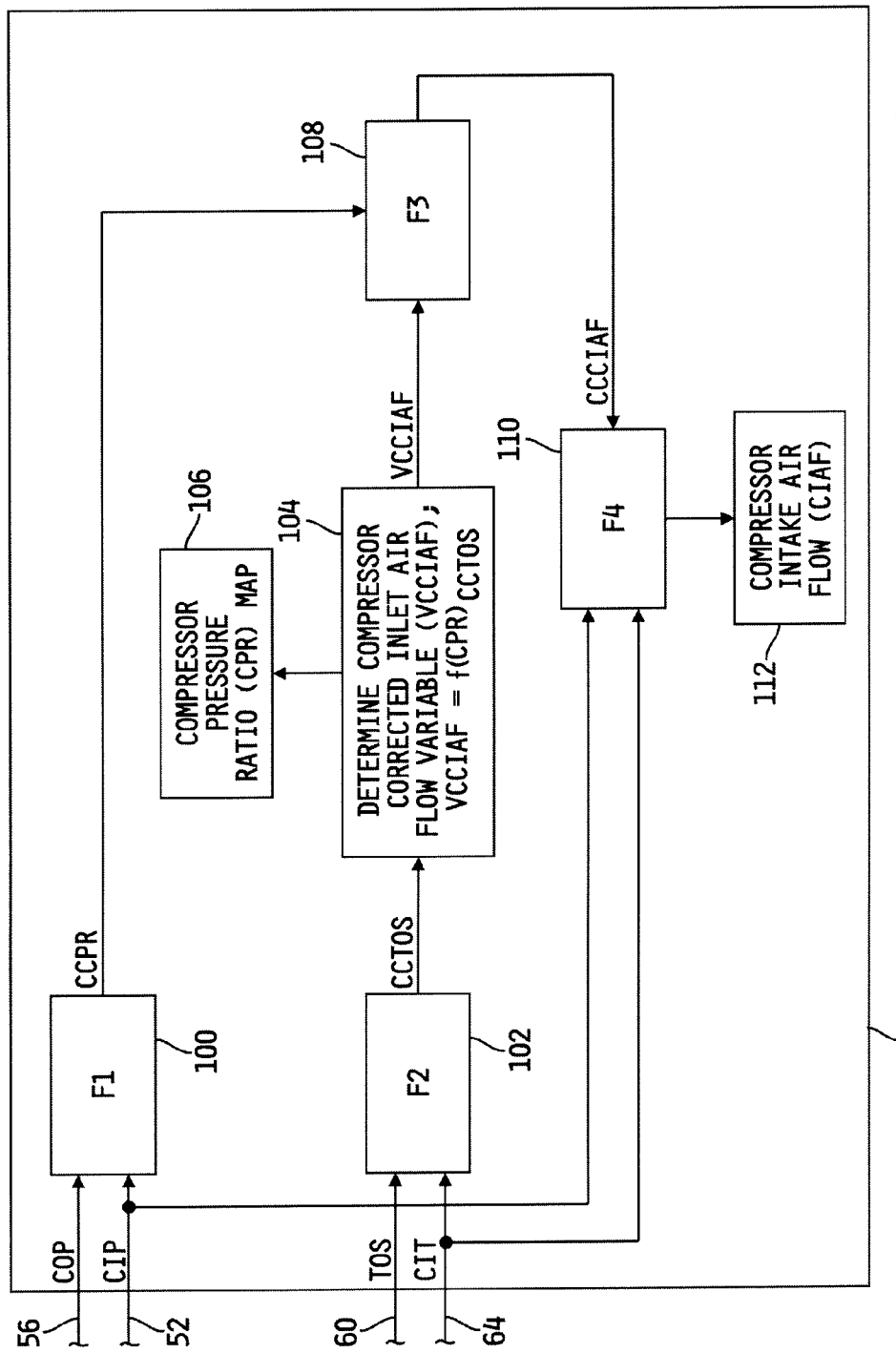
FIG. 2 is a block diagram of one illustrative embodiment of the control circuit of FIG. 1 configured to estimate the flow rate of air entering an air inlet of a turbocharger compressor.

Referring now to FIG. 2, a block diagram is shown of one illustrative embodiment of the control circuit 42 of FIG. 1 configured to estimate the flow rate of air entering the air inlet of the turbocharger compressor 18. It will be understood that the various functional blocks illustrated in FIG. 2 represent individual instructions or instruction sets stored in the memory 44 and executable by the control circuit 42 to carry out the corresponding functions as will be described in greater detail hereinafter. Together, the functional blocks illustrated in FIG. 2 represent one illustrative set of instructions that are stored in the memory unit 44 and executable by the control circuit 42 to estimate the flow rate of air entering the air inlet of the turbocharger compressor 18.

In the illustrated embodiment, the control circuit 42 includes a function block 100 that receives as inputs the compressor inlet pressure and compressor outlet pressure signals, CIP and COP, produced on the signal paths 52 and 56 respectively. The function block 100 processes CIP and COP according to a function F1 to produce a current compressor pressure ratio value, CCPR. In one illustrative embodiment, the function F1 is given by the equation CCPR=COP/CIP, although this disclosure contemplates other embodiments in which F1 includes more, fewer and/or different input parameters and/or constants.

The control circuit 42 illustrated in FIG. 2 further includes another function block 102 that receives as inputs the turbocharger operating speed signal, TOS, produced on the signal path 60 and the compressor inlet temperature signal, CIT, produced on the signal path 64. The function block 102 processes TOS and CIT according to a function F2 to produce a compressor-corrected turbocharger operating speed value, CCTOS, which represents the turbocharger operating speed value, TOS, corrected for certain operating conditions, e.g., temperature, at the inlet 24 of the compressor 18. In one illustrative embodiment, for example, the function F2 is given by the equation CCTOS=TOS/SQRT(CIT/$T_{STD}$), where $T_{STD}$ is a standard reference temperature, e.g., 25° C. or other reference temperature. Alternatively, this disclosure contemplates other embodiments in which F2 includes more, fewer and/or different input parameters and/or constants.

The compressor-corrected turbocharger operating speed value, CCTOS, is provided as an input to another function block 104 that has access to a conventional compressor pressure ratio (CPR) map stored in a memory block 106. The compressor pressure ratio map stored in the memory block 106 is specific to configuration of the turbocharger 20, and the compressor pressure ratio map will generally be different for different turbocharger configurations and/or applications.

Figure 3:
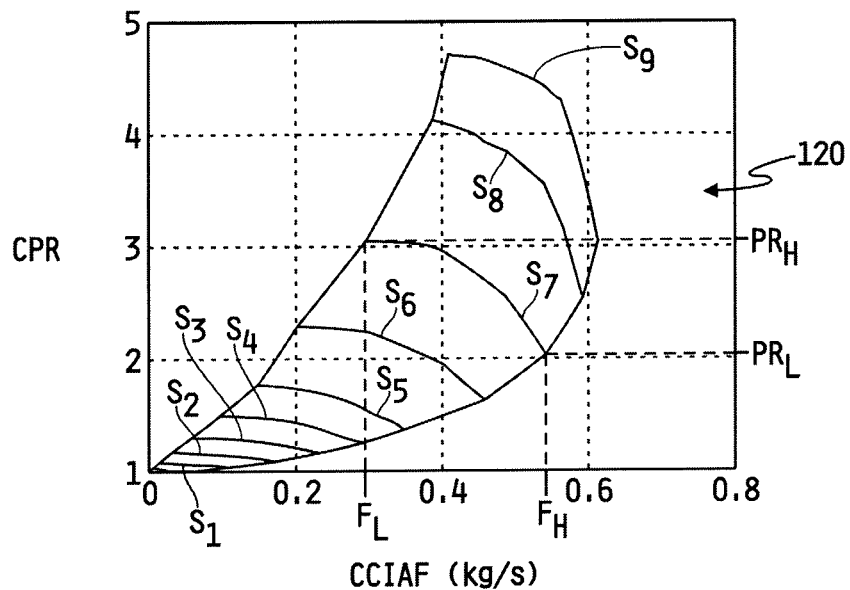
FIG. 3 is a turbocharger compressor pressure ratio map including a plot of turbocharger compressor pressure ratio vs. compressor-corrected inlet air flow for a plurality of different turbocharger operating speed values.

Generally, the compressor pressure ratio map is configured to map compressor-corrected air inlet flow rate values (CCIAF) to compressor pressure ratio values at a plurality of different turbocharger operating speeds, where CCIAF represents the flow rate of air entering the air inlet 24 of the turbocharger compressor 18, corrected for certain operating conditions, e.g., pressure and temperature, at the inlet 24 of the compressor 18. Referring to FIG. 3, an example of one such compressor pressure ratio map 120 is shown. In the illustrated embodiment, the compressor pressure ratio map 120 maps compressor-corrected inlet air flow values, CCIAF, to compressor pressure ratio values, CPR, at a plurality of different compressor-corrected turbocharger operating speeds, where the contours $S_1$-$S_9$ represent lines of different, constant, compressor-corrected turbocharger operating speed values, CCTOS.

Referring again to FIG. 2, the functional block 104 is illustratively operable to process CCTOS using the compressor pressure ratio map 120 to generate a compressor-corrected inlet air flow variable, VCCIAF, as a function of CPR values at the compressor-corrected turbocharger operating speed value produced by the function block 102. In the illustrated embodiment, this function is generally represented by the expression VCCIAF=f(CPR)$_{CCTOS}$ to indicate that VCCIAF is a function of compressor pressure ratio values, CPR, at the specific, i.e., current, compressor-corrected turbocharger operating speed value, CCTOS, produced by the function block 102.

Figure 4:
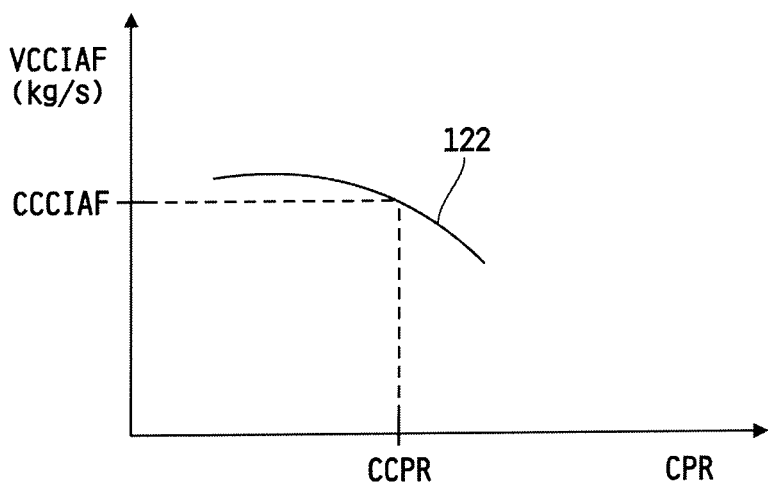
FIG. 4 is an example plot of turbocharger compressor ratio vs. compressor-corrected inlet air flow for a specific, e.g., current, turbocharger operating speed.

Referring again to FIG. 3, one example of the function executed by the function block 104 is illustrated graphically. In this example, for simplicity, the compressor-corrected turbocharger operating speed value, CCTOS, produced by the function block 102 is speed represented by the compressor-corrected turbocharger operating speed contour $S_7$ in FIG. 3. This contour, $S_7$, is thus VCCIAF produced by the function block 104, the value of which may range between CCIAF values of $F_L$ and $F_R$ for corresponding CPR values that range between $PR_H$ and $PR_L$ as illustrated. In many cases, the compressor-corrected turbocharger operating speed value, CCTOS, will not correspond directly to one of the compressor-corrected turbocharger operating speed contours $S_1$-$S_9$, and in such cases a constant-speed, compressor-corrected turbocharger operating speed contour for CCTOS is illustratively determined using one or more conventional interpolation techniques. In any case, the general functional relationship between VCCIAF and CPR for a single CCTOS value is illustrated by example in FIG. 4.

The current compressor pressure ratio, CCPR, produced by the functional block 100 and the compressor-corrected inlet air flow variable, VCCIAF, produced by the functional block 104 are provided as inputs to another functional block 106. The functional block 106 estimates the current value, CCCIAF, of the compressor-corrected inlet air flow, CCIAF, according to a function F3. Illustratively, the function F3 is carried out by evaluating the variable VCCIAF at the current compressor pressure ratio, CCPR, produced by the function block 102. This is illustrated graphically in FIG. 4 where the current compressor pressure ratio value, CCPR, is mapped by the compressor-corrected inlet air flow variable, VCCIAF, directly to the current value, CCCIAF, of the compressor-corrected inlet air flow value, CCCIAF.

In another example embodiment, the functional block 108 may be omitted, and the compressor-corrected turbocharger operating speed, CCTOS, produced by the function block 102 and the current compressor pressure ratio value, CCPR, produced by the function block 102 may together be mapped via the compressor pressure ratio map, e.g., 120, directly to the current compressor-corrected inlet air flow value, CCCIAF, using conventional interpolation techniques. In any case, the control circuit 42 illustrated in FIG. 2 further includes another functional block 110 that receives as inputs the compressor inlet pressure signal, CIP, produced on the signal path 52, the compressor inlet temperature signal, CIT, produced on the signal path 64 and the compressor-corrected inlet air flow estimate, CCCIAF. The functional block 110 processes CIT and CCTOS according to a function F4 to produce an estimate of the actual compressor inlet air flow rate, CIAF. In one illustrative embodiment, for example, the function F4 is given by the equation CIAF=CCCIAF*(CIP/$P_{STD}$)/SQRT(CIT/$T_{STD}$), where $P_{STD}$ is a standard reference pressure, e.g., 101.3 kpa or other reference pressure and $T_{STD}$ is as described herein above. The compressor inlet air flow rate estimate, CIAF, is stored in a memory block 112 for use by one or more control algorithms executed by the control circuit 42 and/or external control circuit or system.

The algorithm illustrated in FIG. 2 is continually executed by the control circuit 42 to thereby continually estimate the flow rate of air entering the air inlet of the turbocharger compressor 18 under steady state and transient operating conditions.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for estimating a flow rate of air entering an air inlet of a compressor of a turbocharger, the system comprising:
    a first pressure sensor configured to produce a first pressure signal indicative of pressure at or near the air inlet of the compressor,
    a second pressure sensor configured to produce a second pressure signal indicative of pressure at or near the air outlet of the compressor,
    a temperature sensor configured to produce a temperature signal indicative of temperature at or near the air inlet of the compressor,
    a speed sensor configured to produce a speed signal indicative of an operating speed of the turbocharger, and
    a control circuit including a memory having instructions stored therein that are executable by the control circuit to estimate the flow rate of air entering the air inlet of the compressor as a function of the first and second pressure signals, the temperature signal and the speed signal.

2. The system of claim 1 wherein the memory has stored therein a map of compressor pressure ratio values as a function of compressor inlet air flow rate values at a plurality of different turbocharger operating speeds, and
    wherein the instructions stored in the memory include instructions that are executable by the control circuit to process the speed signal using the map to generate a compressor inlet air flow rate variable as a function of compressor pressure ratio values at a turbocharger operating speed that corresponds to the speed signal.

3. The system of claim 2 wherein the instructions stored in the memory include instructions that are executable by the control circuit to determine a compressor-corrected turbocharger operating speed value as a function of the speed signal and the temperature signal, and
    wherein the map is stored in the memory as a map of compressor pressure ratio values as a function of compressor-corrected inlet air flow rate values at a plurality of different compressor-corrected turbocharger operating speeds, and wherein the estimated the flow rate of air entering the air inlet of the compressor is an estimated compressor-corrected flow rate of air entering the air inlet of the compressor.

4. The system of claim 3 wherein the instructions stored in the memory include instructions that are executable by the control circuit to determine a current compressor pressure ratio value as a function of the first and second pressure values, and to process the current compressor pressure ratio value using the compressor-corrected inlet air flow rate variable to estimate the compressor-corrected flow rate of air entering the air inlet of the compressor.

5. The system of claim 4 wherein the instructions stored in the memory include instructions that are executable by the control circuit to estimate the flow rate of air entering the air inlet of the compressor as a function of the compressor-corrected flow rate of air entering the air inlet of the compressor, the first pressure signal and the temperature signal.

6. The system of claim 1 wherein the instructions stored in the memory include instructions that are executable by the control circuit to determine a current compressor pressure ratio as a function of the first and second pressure signals, and to process the current compressor pressure ratio, the speed signal and the temperature signal using a compressor pressure ratio map to estimate the flow rate of air entering the air inlet of the compressor.

7. The system of claim 6 wherein the estimated flow rate of air entering the air inlet of the compressor represents a compressor-corrected flow rate of air entering the air inlet of the compressor, and
wherein the instructions stored in the memory include instructions that are executable by the control circuit to estimate the flow rate of air entering the air inlet of the compressor as a function of the compressor-corrected flow rate of air entering the air inlet of the compressor, the first pressure signal and the temperature signal.

8. The system of claim 1 wherein the control circuit is configured to control operation of an internal combustion engine operatively coupled to the turbocharger.

9. A system for estimating a flow rate of air entering an air inlet of a compressor of a turbocharger, the system comprising:
a first pressure sensor configured to produce a first pressure signal indicative of pressure at or near the air inlet of the compressor,
a second pressure sensor configured to produce a second pressure signal indicative of pressure at or near the air outlet of the compressor,
a speed sensor configured to produce a speed signal indicative of operating speed of the turbocharger, and
a control circuit including a memory having instructions stored therein that are executable by the control circuit to process the speed signal to determine a speed value corresponding to an operating speed of the turbocharger, to determine a current compressor pressure ratio value as a function of the first and second pressure signals, and to process the speed value and the current compressor pressure ratio value using a compressor pressure ratio map to estimate the flow rate of air entering the air inlet of the compressor.

10. The system of claim 9 further comprising a temperature sensor configured to produce a temperature signal indicative of temperature at or near the air inlet of the compressor,
wherein the instructions stored in the memory include instructions that are executable by the control circuit to determine a compressor-corrected turbocharger operating speed as a function of the speed signal and the temperature signal, and
wherein the speed value is the compressor-corrected turbocharger operating speed.

11. The system of claim 10 wherein the compressor pressure ratio map is stored in the memory and is configured to map compressor inlet air flow rate values to compressor pressure ratio values at a plurality of different compressor-corrected turbocharger operating speeds, and
wherein the instructions stored in the memory include instructions that are executable by the control circuit to generate a compressor inlet air flow variable as a function of compressor pressure ratio values by processing the compressor-corrected turbocharger operating speed using the compressor pressure ratio map, and to estimate the flow rate of air entering the air inlet of the compressor by processing compressor inlet air flow variable using the current compressor pressure ratio value.

12. The system of claim 11 wherein the compressor pressure ratio map is configured to map compressor-corrected inlet air flow rate values to compressor pressure ratio values at the plurality of different compressor-corrected turbocharger operating speeds, and
wherein the compressor inlet air flow variable is a compressor-corrected inlet air flow variable, and the estimate of the flow rate of air entering the air inlet of the compressor is an estimate of a compressor-corrected inlet air flow rate, and
wherein the instructions stored in the memory further include instructions that are executable by the control circuit to estimate the flow rate of air entering the air inlet of the compressor as a function of the compressor-corrected inlet air flow rate, the first pressure signal and the temperature signal.

13. The system of claim 9 further comprising a temperature sensor configured to produce a temperature signal indicative of temperature at or near the air inlet of the compressor,
wherein the instructions stored in the memory include instructions that are executable by the control circuit to determine the speed value further as a function of the temperature signal, and to estimate the flow rate of air entering the air inlet of the compressor further as a function of the first pressure signal and the temperature signal.

14. The system of claim 9 wherein the control circuit is configured to control operation of an internal combustion engine operatively coupled to the turbocharger.

15. A method of estimating a flow rate of air entering an air inlet of a compressor of a turbocharger, the method comprising:
determining a first pressure value corresponding to pressure at or near the air inlet of the compressor,
determining a second pressure value corresponding to pressure at or near the air outlet of the compressor,
determining a temperature value corresponding to a temperature at or near the air inlet of the compressor,
determining a speed value corresponding to an operating speed of the turbocharger, and
estimating the flow rate of air entering the air inlet of the compressor as a function of the first pressure value, the second pressure value, the temperature value and the speed value.

16. The method of claim 15 wherein estimating the flow rate of air entering the air inlet of the compressor comprises:
determining a current compressor pressure ratio as a function of the first and second pressure values, and processing the speed value and the current compressor pressure ratio using a compressor pressure ratio map to estimate the flow rate of air entering the air inlet of the compressor, the compressor pressure ratio map configured to map compressor air inlet flow rate values to compressor pressure ratio values at a plurality of different turbocharger operating speeds.

17. The method of claim 16 further comprising determining a compressor-corrected turbocharger operating speed as a function of the speed value and the temperature value, wherein the compressor pressure ratio map is configured to map compressor-corrected inlet air flow rate values to compressor pressure ratio values at a plurality of different compressor-corrected turbocharger operating speeds, and wherein processing the speed value and the current compressor pressure ratio using a compressor pressure ratio map to estimate the flow rate of air entering the air inlet of the compressor comprises processing the compressor-corrected turbocharger operating speed and the current compressor pressure ratio using the compressor pressure ratio map to estimate a compressor-corrected inlet air flow rate value, and to estimate the flow rate of air entering the air inlet of the compressor as a function of the compressor-corrected inlet air flow rate value, the first pressure value and the temperature value.

18. The method of claim 17 wherein processing the compressor-corrected turbocharger operating speed and the current compressor pressure ratio using the compressor pressure ratio map to estimate a compressor-corrected inlet air flow rate value comprises using the compressor pressure ratio map to generate a compressor-corrected inlet air flow variable as a function of compressor pressure ratio values at the compressor-corrected turbocharger operating speed, and processing the compressor-corrected inlet air flow variable using the current compressor pressure ratio to estimate the compressor-corrected inlet air flow rate value.

19. The method of claim 15 further comprising using a control circuit configured to control operation of an internal combustion engine to which the turbocharger is operatively coupled to execute all of the determining steps and the estimating step.

20. The method of claim 15 further comprising:
determining the first pressure by processing a first pressure signal produced by a first pressure sensor positioned at the air inlet of the compressor,
determining the second pressure by processing a second pressure signal produced by a second pressure sensor positioned at the air outlet of the compressor,
determining the speed value by processing a speed signal produced by a speed sensor configured to be positioned to sense the operating speed of the turbocharger, and
determining the temperature value by processing a temperature signal produced by a temperature sensor positioned at the air inlet of the compressor.

\* \* \* \* \*